(12) United States Patent
Murray et al.

(10) Patent No.: US 11,871,696 B2
(45) Date of Patent: Jan. 16, 2024

(54) SYSTEM FOR DETECTING CROP LEVELS WITHIN AN ELEVATOR OF AN AGRICULTURAL HARVESTER

(71) Applicant: CNH Industrial America LLC, New Holland, PA (US)

(72) Inventors: Craig E. Murray, Davenport, IA (US); Carlos Visconti, São Paulo (BR)

(73) Assignee: CNH Industrial America LLC, New Holland, PA (US)

( * ) Notice: Subject to any disclaimer, the term of this patent is extended or adjusted under 35 U.S.C. 154(b) by 790 days.

(21) Appl. No.: 16/978,740

(22) PCT Filed: Mar. 5, 2019

(86) PCT No.: PCT/US2019/020633
§ 371 (c)(1),
(2) Date: Sep. 7, 2020

(87) PCT Pub. No.: WO2019/173253
PCT Pub. Date: Sep. 12, 2019

(65) Prior Publication Data
US 2023/0189706 A1 Jun. 22, 2023

Related U.S. Application Data

(60) Provisional application No. 62/639,193, filed on Mar. 6, 2018.

(51) Int. Cl.
*A01D 41/12* (2006.01)
*A01D 43/07* (2006.01)
(Continued)

(52) U.S. Cl.
CPC ......... *A01D 41/127* (2013.01); *A01D 43/073* (2013.01); *A01D 45/10* (2013.01)

(58) Field of Classification Search
CPC ..... A01D 41/127; A01D 43/073; A01D 45/10
See application file for complete search history.

(56) References Cited

U.S. PATENT DOCUMENTS 3,085,517 A    4/1963   Smith
3,415,371 A   12/1968   Schultz
(Continued)

FOREIGN PATENT DOCUMENTS

JP          2781340 B2    7/1998
WO   2015/052563 A1    4/2015
(Continued)

OTHER PUBLICATIONS

Search Report from U.S. Appl. No. 16/466,870 dated Mar. 25, 2021. (20 pages).
(Continued)

*Primary Examiner* — Abigail A Risic
(74) *Attorney, Agent, or Firm* — Peter K. Zacharias

(57) ABSTRACT

In one aspect, a system for detecting crop levels within an agricultural harvester may include an elevator extending between a proximal end and a distal end, with the elevator being configured to carry harvested crops between the proximal end of the elevator and the distal end of the elevator. The system may also include a crop level sensor provided in operative association with the elevator. The crop level sensor may include a sensor body and a paddle pivotably coupled to the sensor body such that the paddle is configured to pivot relative to the sensor body when a crop level of the harvested crops conveyed by the elevator exceeds a threshold crop.

18 Claims, 9 Drawing Sheets

(51) Int. Cl.
*A01D 45/10* (2006.01)
*A01D 41/127* (2006.01)
*A01D 43/073* (2006.01)

(56) References Cited

U.S. PATENT DOCUMENTS

| | | | |
|---|---|---|---|
| 4,039,434 A | 8/1977 | Croucher | |
| 4,121,778 A | 10/1978 | Quick | |
| 5,031,392 A | 7/1991 | Baker | |
| 6,068,059 A | 5/2000 | Bajema et al. | |
| 6,074,298 A * | 6/2000 | Majkrzak | A01D 41/1208 460/119 |
| 6,242,927 B1 * | 6/2001 | Adams | G01N 27/223 324/663 |
| 6,272,819 B1 * | 8/2001 | Wendte | A01D 41/1274 56/11.9 |
| 6,508,049 B1 * | 1/2003 | Cox | A01D 45/10 56/10.2 R |
| 7,681,388 B1 | 3/2010 | Hinds et al. | |
| 7,805,916 B2 | 10/2010 | Hinds et al. | |
| 7,874,899 B2 | 1/2011 | Mackin et al. | |
| 8,032,255 B2 * | 10/2011 | Phelan | G01F 13/005 701/50 |
| 9,137,945 B2 | 9/2015 | Farley et al. | |
| 9,358,586 B2 | 6/2016 | Brown et al. | |
| 9,485,905 B2 * | 11/2016 | Jung | A01D 41/127 |
| 9,788,485 B2 | 10/2017 | Craig et al. | |
| 9,949,435 B2 * | 4/2018 | Banks, Jr. | A01D 41/1208 |
| 10,694,671 B2 * | 6/2020 | Terryn | A01D 69/08 |
| 2002/0133309 A1 | 9/2002 | Hardt | |
| 2006/0277883 A1 | 12/2006 | Berger et al. | |
| 2007/0266690 A1 | 11/2007 | Buehler et al. | |
| 2007/0270200 A1 | 11/2007 | Smith | |
| 2009/0101371 A1 * | 4/2009 | Melanson | A01B 69/004 172/6 |
| 2009/0291723 A1 * | 11/2009 | Missotten | A01D 41/1277 460/22 |
| 2010/0307121 A1 | 12/2010 | Marchini | |
| 2011/0308222 A1 | 12/2011 | Sauerwein | |
| 2014/0262548 A1 * | 9/2014 | Acheson | G01G 21/23 177/136 |
| 2017/0112058 A1 | 4/2017 | Craig et al. | |
| 2017/0112059 A1 | 4/2017 | Craig et al. | |
| 2019/0053427 A1 | 2/2019 | Matway et al. | |
| 2019/0124848 A1 | 5/2019 | Johnson et al. | |
| 2020/0128743 A1 | 4/2020 | Pereira et al. | |

FOREIGN PATENT DOCUMENTS

| | | |
|---|---|---|
| WO | 2015/156774 A1 | 10/2015 |
| WO | 2017/187250 A1 | 11/2017 |

OTHER PUBLICATIONS

International Search Report and Written Opinion for Application No. PCT/US2019/020633 dated May 3, 2019 (eight pages).

* cited by examiner

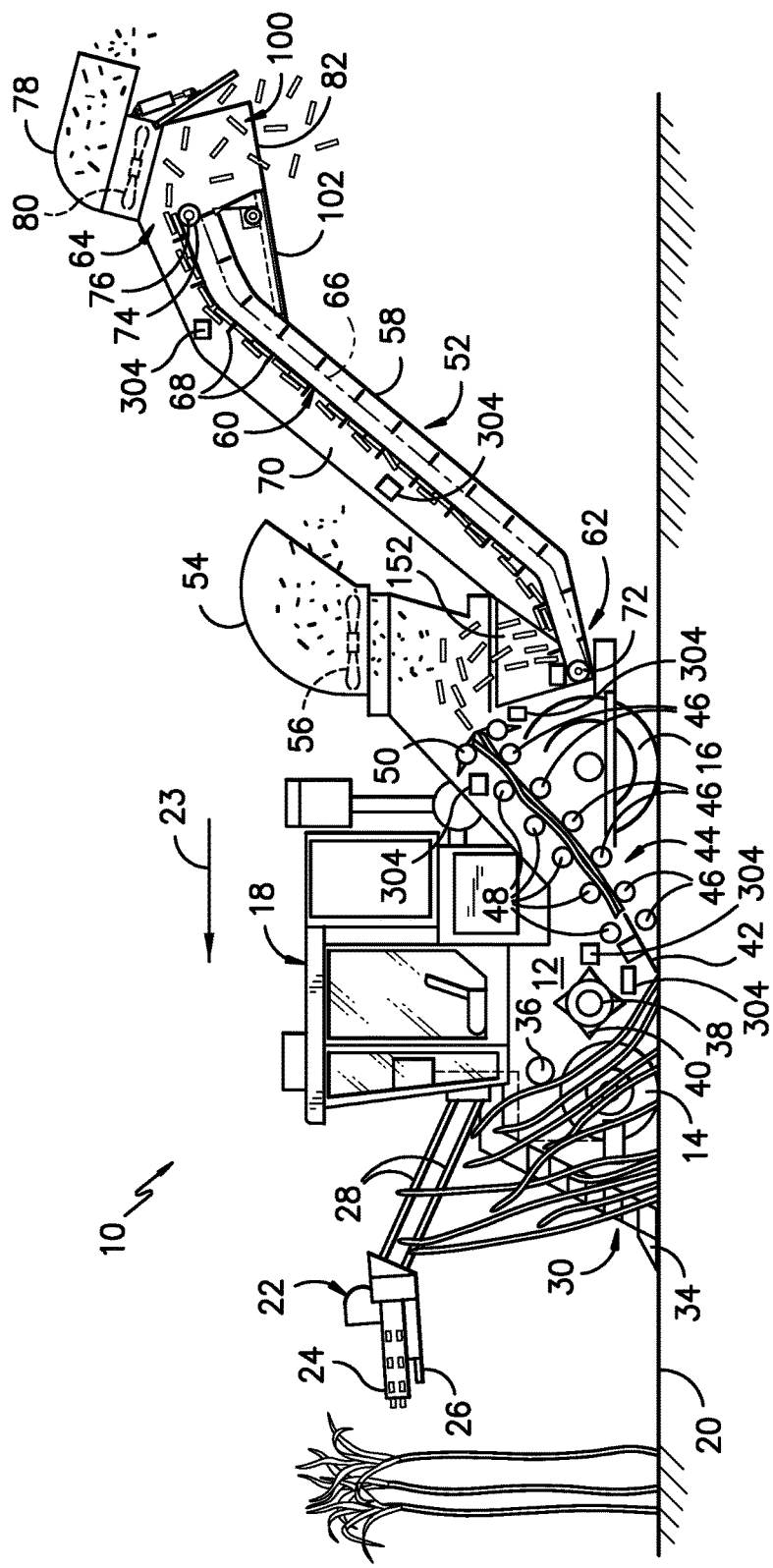
FIG. -1-

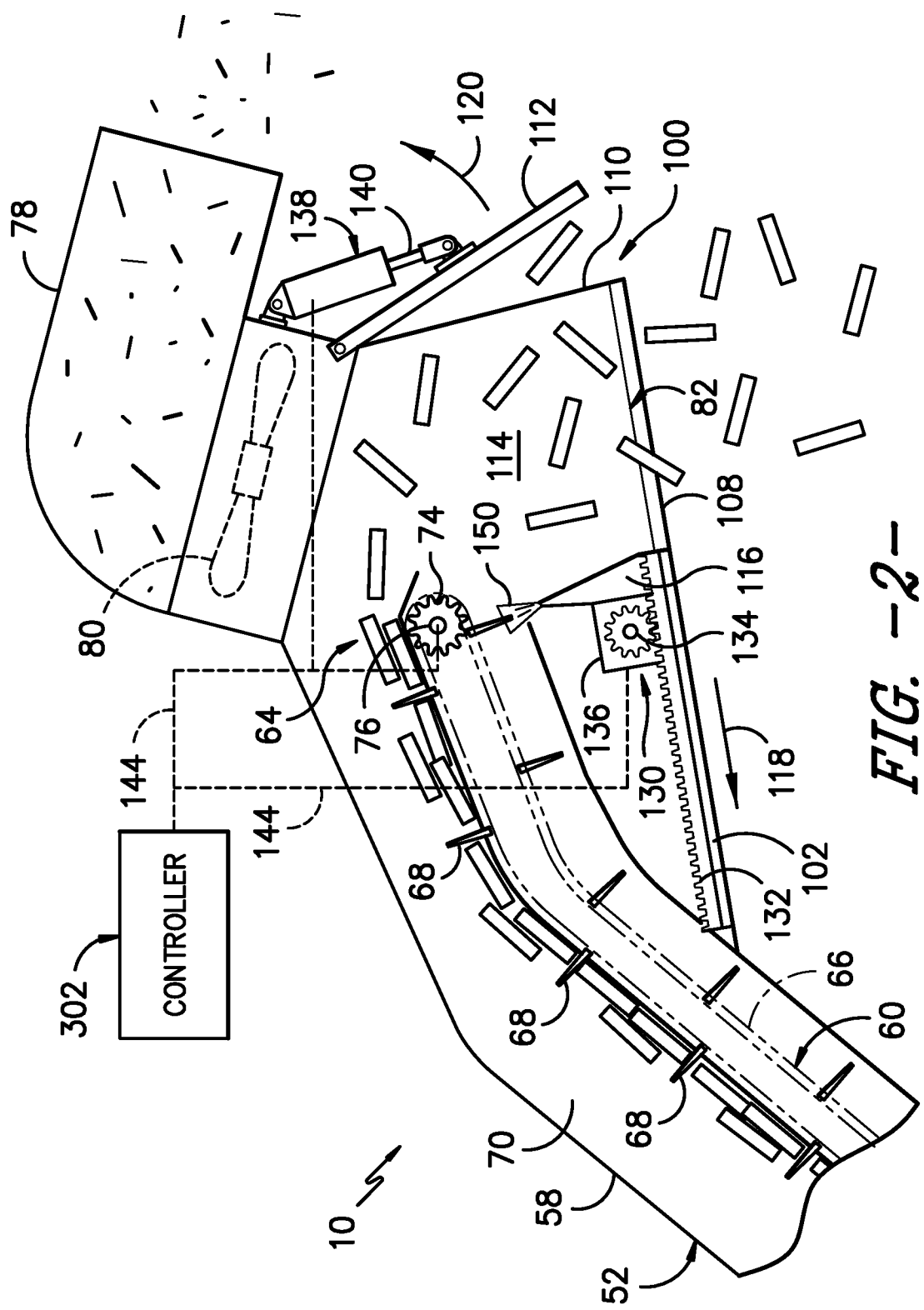
FIG. -2-

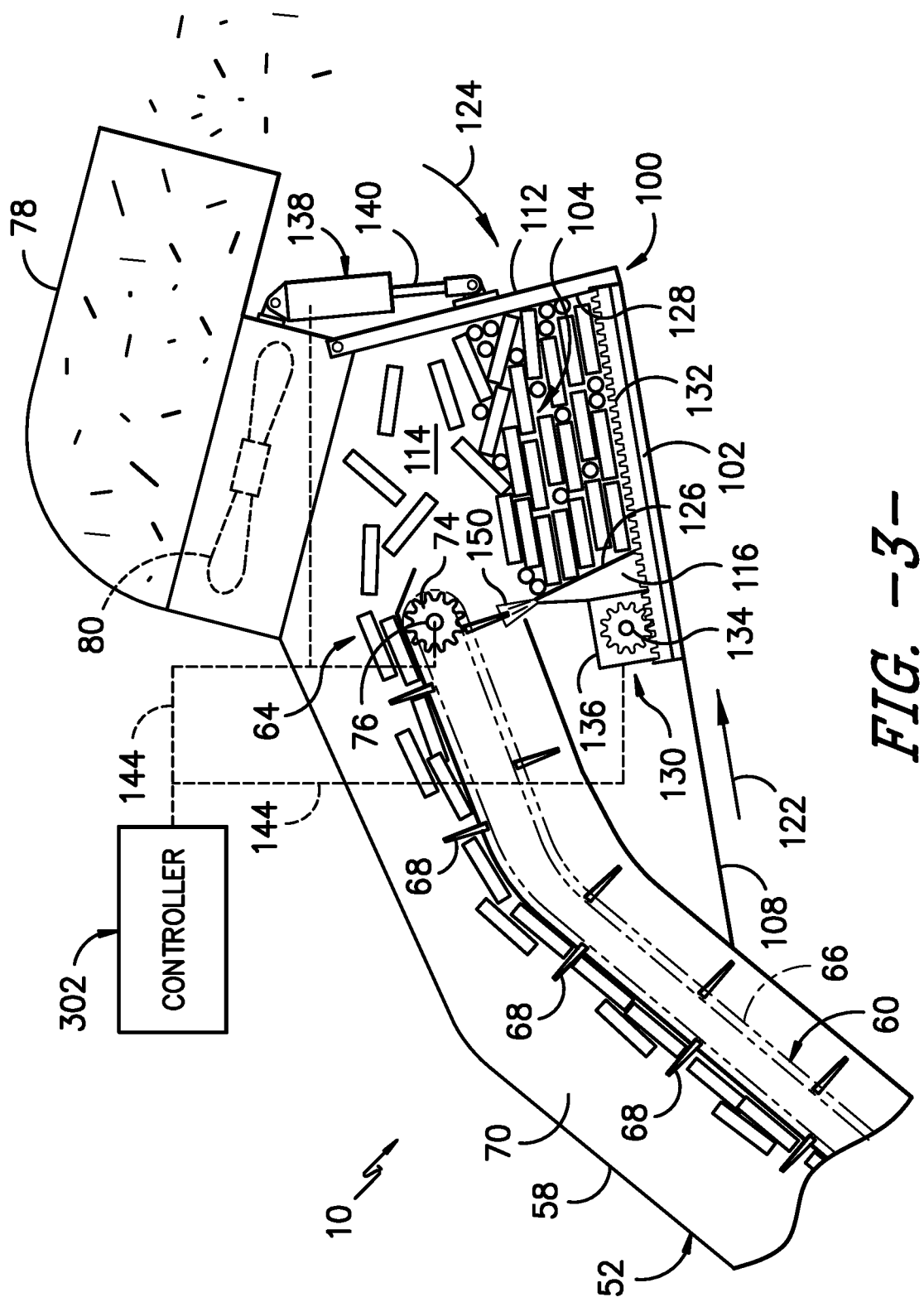
FIG. -3-

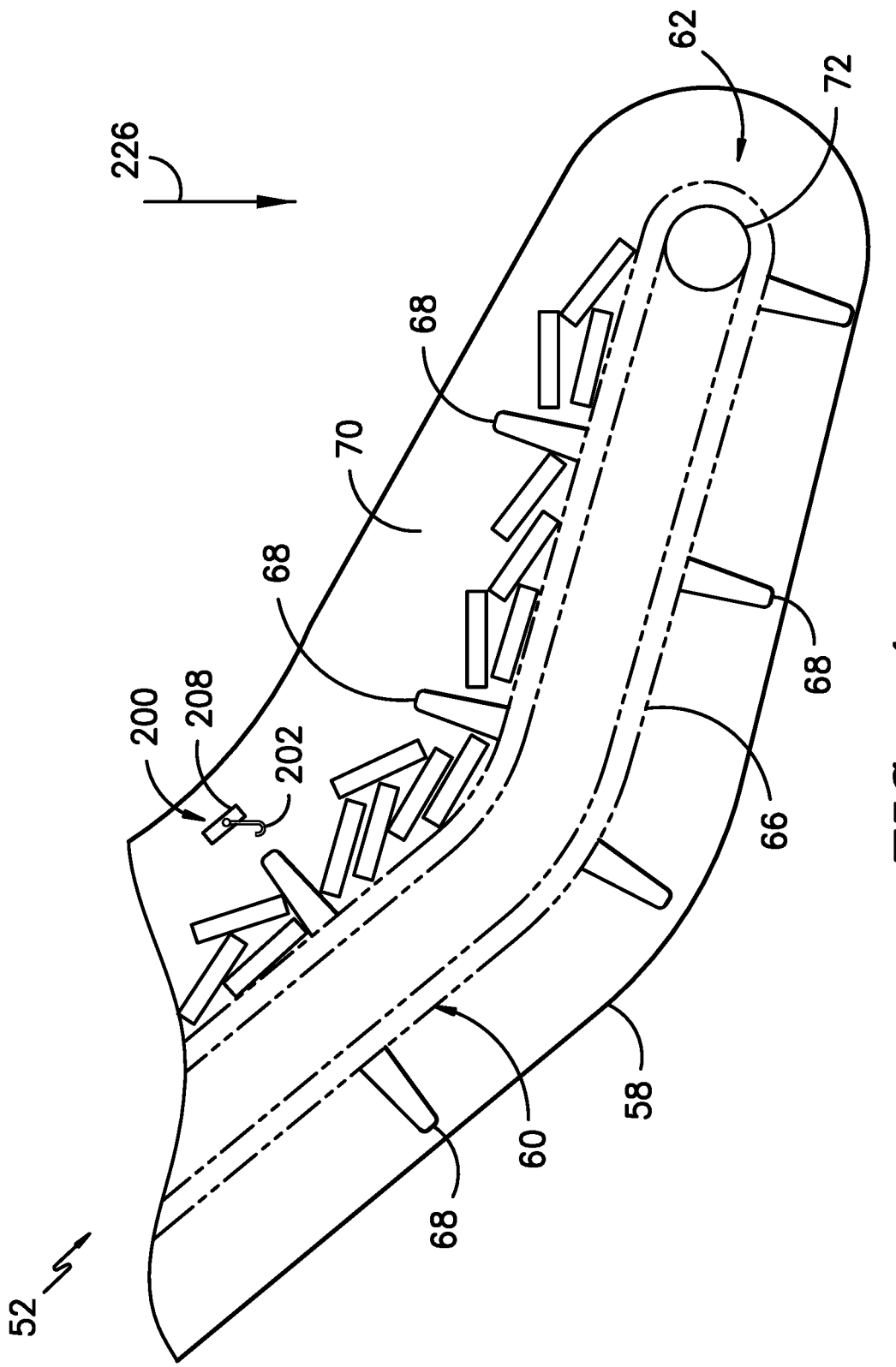
FIG. -4-

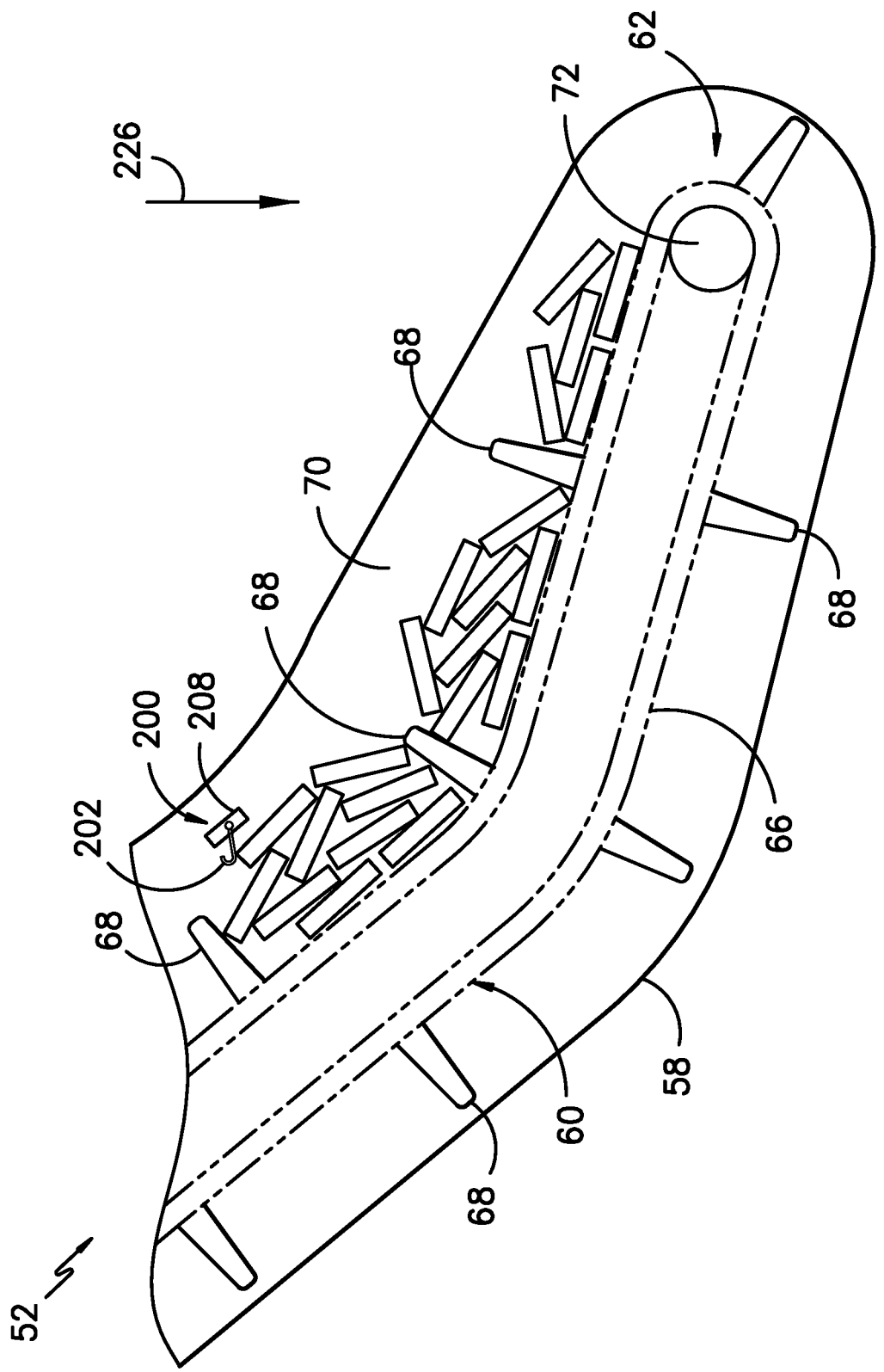
FIG. -5-

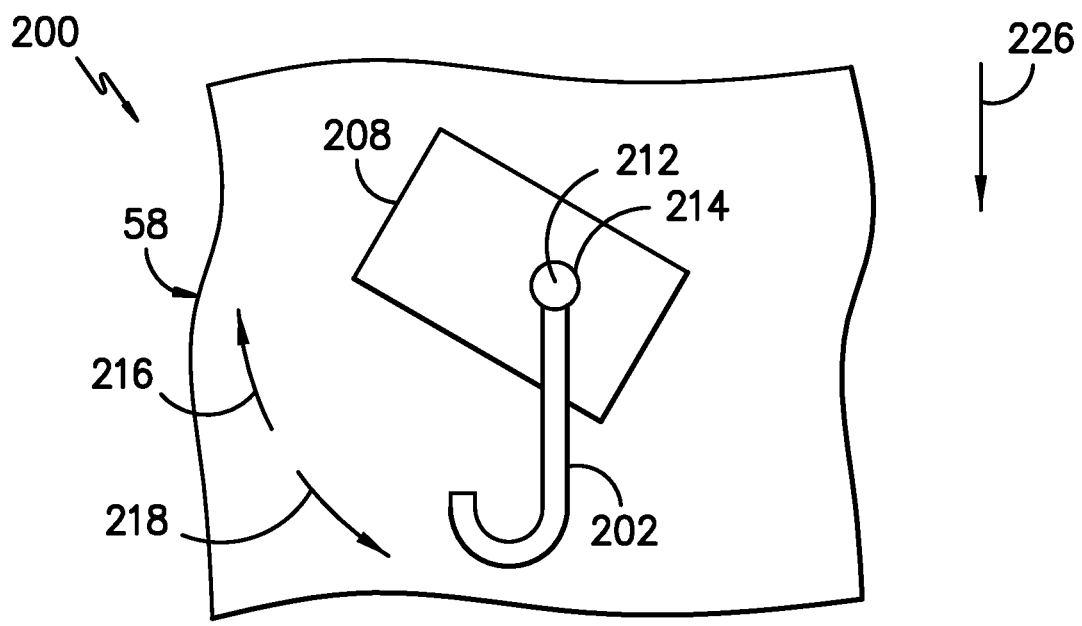
FIG. -6-
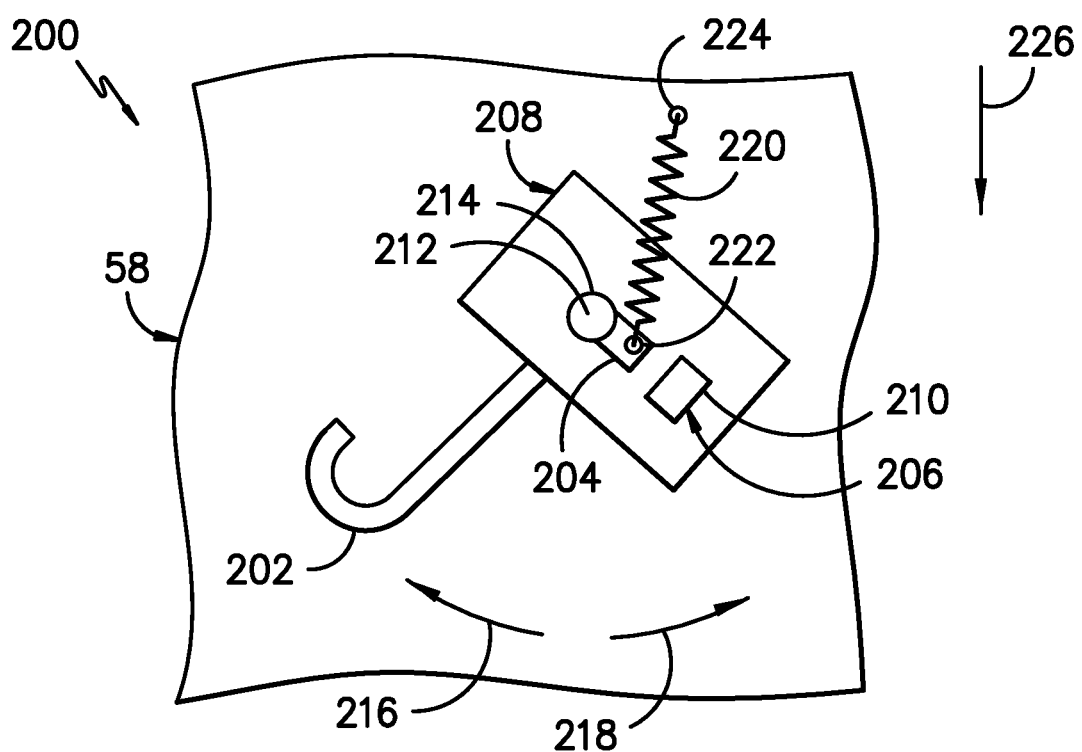
FIG. -7-

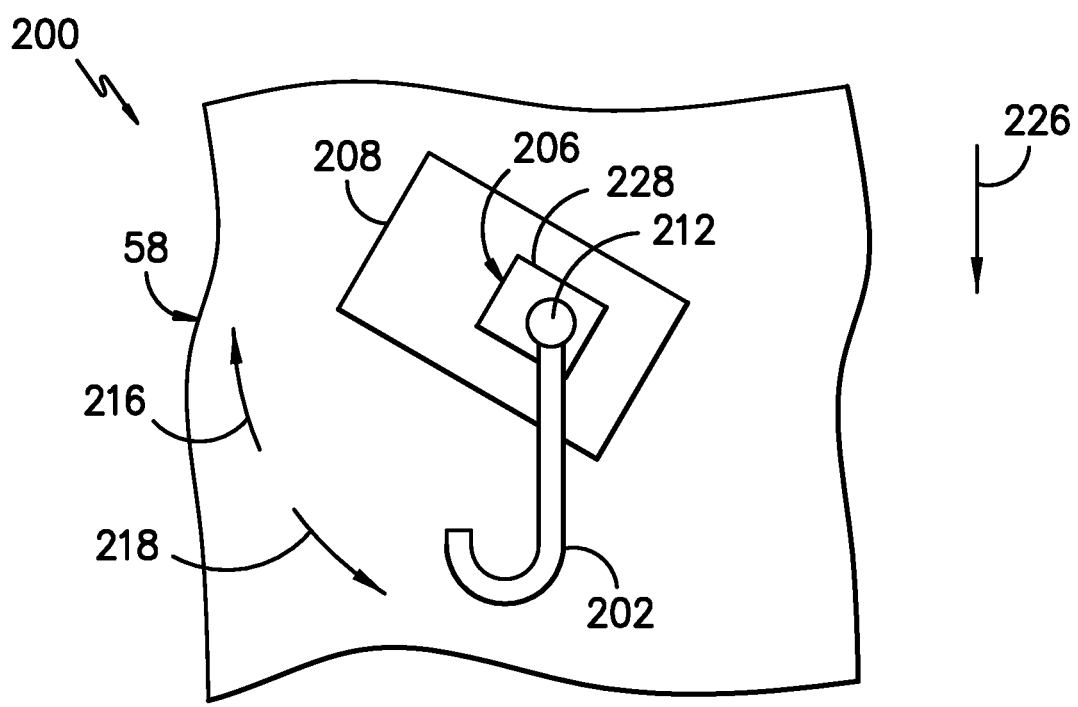
FIG. -8-

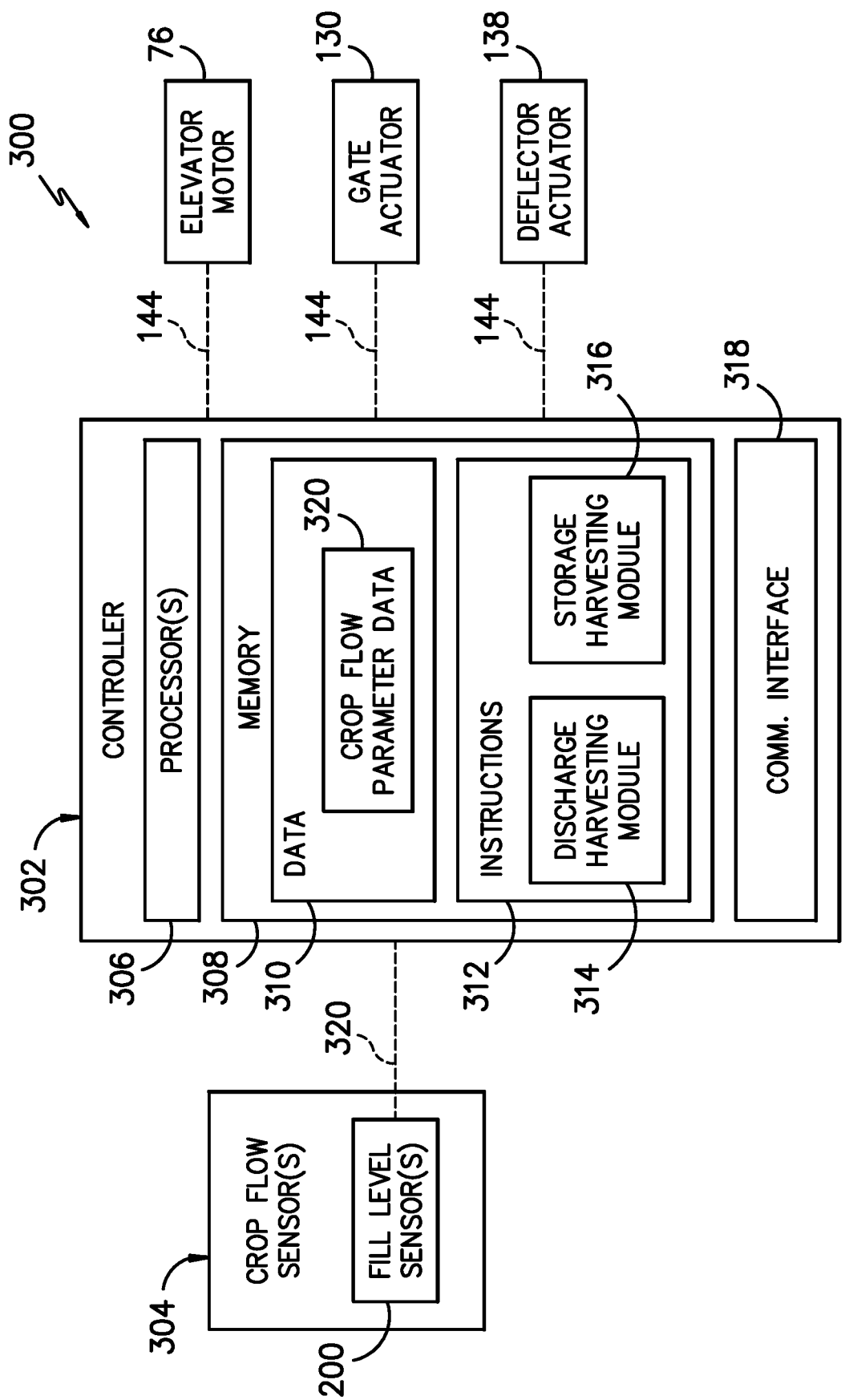
FIG. -9-

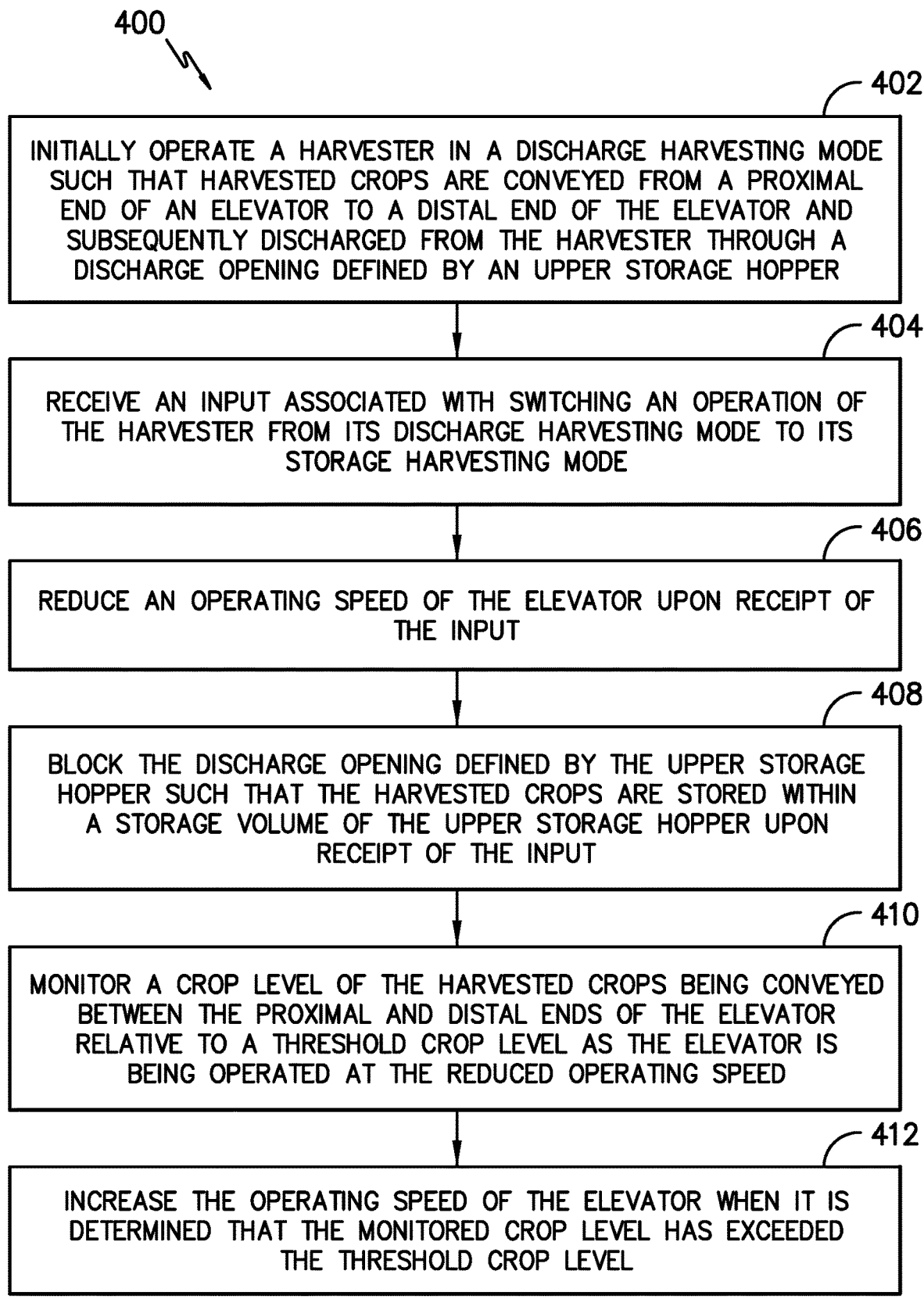
FIG. -10-

SYSTEM FOR DETECTING CROP LEVELS WITHIN AN ELEVATOR OF AN AGRICULTURAL HARVESTER

FIELD OF THE INVENTION

The present disclosure generally relates to agricultural harvesters, such as sugar cane harvesters, and, more particularly, to systems for detecting crop levels of harvested crops present within an elevator of an agricultural harvester during operation of the harvester.

BACKGROUND OF THE INVENTION

Typically, agricultural harvesters are accompanied by a receiver for harvested crops, such as a truck that is driven beside or behind the harvester, or a wagon towed by a truck or tractor. An unloading conveyor or elevator extends from the harvester and is operable during the harvesting operation as it moves along the field for unloading the harvested crops to the accompanying receiver.

Some harvesters, particularly combine harvesters, have an on-board crop carrying capability, such as a large grain tank, so as to not need to be constantly accompanied by a receiver for the harvested crops. Other harvesters have only limited on-board carrying capability and require substantially constant accompaniment by an external receiver or storage device. For instance, sugar cane harvesters have an elongate, upwardly inclined elevator that utilizes one or more circulating chains to convey flights or other crop carrying elements upwardly along an upwardly facing top span of the elevator, and downwardly along a downwardly facing bottom span of the elevator in an endless loop. Harvested sugar canes are typically cut into shorter billets and then carried by the flights upwardly along the top span of the elevator and for subsequent discharge from the distal end of the elevator into the accompanying receiver, such as a billet cart.

When an external receiver for a sugarcane harvester is absent or is otherwise not properly positioned relative to the harvester, the unloading elevator must be stopped to prevent the conveyed billets from being discharged onto the ground. This situation can arise under a variety of conditions, such as when the accompanying receiver is full and must leave the harvester to unload. As another example, the receiver may often be a towed wagon (along with its towing vehicle) defining a larger turning radius that the harvester itself. In such instances, when a turn is being executed at the end of the field, the receiver may not be immediately present for receiving the harvested crops. As a result, the harvester may have to pause operation until the receiver is able to be properly positioned relative to the harvester. In either situation, there is significant loss in the productivity of the harvester.

Accordingly, systems and methods that allow for a harvester to continue harvesting when an external receiver is not properly positioned relative to the harvester would be welcomed in the technology. Furthermore, systems and methods that allow for the crop levels within an elevator of a harvester to be detected and/or monitored would be welcomed in the technology.

BRIEF DESCRIPTION OF THE INVENTION

Aspects and advantages of the technology will be set forth in part in the following description, or may be obvious from the description, or may be learned through practice of the technology.

In one aspect, the present subject matter is directed to a system for detecting crop levels within an agricultural harvester. The system may include an elevator extending between a proximal end and a distal end, with the elevator being configured to carry harvested crops between the proximal end of the elevator and the distal end of the elevator. The system may also include a crop level sensor provided in operative association with the elevator. The crop level sensor may include a sensor body and a paddle pivotably coupled to the sensor body such that the paddle is configured to pivot relative to the sensor body when a crop level of the harvested crops conveyed by the elevator exceeds a threshold crop.

In another aspect, the present subject matter is directed to a system for operating an agricultural harvester. The system may include an elevator extending between a proximal end and a distal end, with the elevator being configured to convey harvested crops between the proximal end of the elevator and distal end of the elevator. The system may also include a crop level sensor configured to detect a crop level of the harvested crops conveyed by the elevator. Furthermore, the system may include a controller communicatively coupled to the sensor. The controller may be configured to determine a first number of times that the crop level of the harvested crops carried by the elevator exceeds a first threshold crop level during a first predetermined time period based on signals received from the crop level sensor. Moreover, the controller may further be configured to initiate a first control action when the determined first number of times exceeds a threshold number.

In a further aspect, the present subject matter is directed to a method for operating an agricultural harvester. The harvester may include an elevator assembly including an elevator extending between a proximal end and a distal end, with the elevator assembly further including a storage hopper positioned adjacent to the distal end of the elevator. The method may include initially operating the harvester in a discharge harvesting mode such that harvested crops are conveyed from the proximal end of the elevator to the distal end of the elevator and subsequently discharged from the harvester through a discharge opening defined by the storage hopper. Upon receipt of an input associated with operating the harvester in a storage harvesting mode, the method may include reducing an operating speed of the elevator and blocking the discharge opening defined by the storage hopper such that harvested crops expelled from the distal end of the elevator are stored within a storage volume of the storage hopper. Moreover, the method may include monitoring a crop level of the harvested crops being conveyed between the proximal and distal ends of the elevator relative to a threshold crop level as the elevator as being operated at the reduced operating speed. Additionally, the method may include increasing the operating speed of the elevator when it is determined that the monitored crop level has exceeded the threshold crop level.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 1 illustrates a simplified, side view of one embodiment of an agricultural harvester in accordance with aspects of the present subject matter;

FIG. 2 illustrates a side view of a distal portion of an elevator assembly of the harvester shown in FIG. 1, particularly illustrating components of a storage hopper of the elevator assembly at an open or discharge position(s) to allow harvested crops to be discharged from the elevator assembly in accordance with aspects of the present subject matter;

FIG. 3 illustrates another side view of the distal portion of the elevator assembly shown in FIG. 2, particularly illustrating the components of the storage hopper at a closed or storage position(s) to allow harvested crops to be temporarily stored within the storage hopper in accordance with aspects of the present subject matter;

FIG. 4 illustrates a side view of a proximal portion of an elevator assembly of the harvester shown in FIG. 1, particularly illustrating components of a crop level sensor when a crop level of harvested crops being carried by an elevator of the elevator assembly falls below a threshold level in accordance with aspects of the present subject matter;

FIG. 5 illustrates another side view of the proximal portion of the elevator assembly shown in FIG. 4, particularly illustrating the components of the crop level sensor when the crop level of the harvested crops being carried by the elevator of the elevator assembly exceeds the threshold level in accordance with aspects of the present subject matter;

FIG. 6 illustrates a front view of one embodiment of a crop level sensor in accordance with aspects of the present subject matter, particularly illustrating a paddle of the sensor pivotably coupled to a sensor body;

FIG. 7 illustrates a rear view of the embodiment of the crop level sensor shown in FIG. 6, particularly illustrating a proximity sensor element of the sensor configured for detecting movement of an arm of the sensor that is coupled to the paddle in accordance with aspects of the present subject matter;

FIG. 8 illustrates a front view of another embodiment of a crop level sensor in accordance with aspects of the present subject matter, particularly illustrating a potentiometer of the sensor configured for detecting movement of a paddle of the sensor relative to a sensor body;

FIG. 9 illustrates a schematic view of one embodiment of a system for operating a harvester in accordance with aspects of the present subject matter; and FIG. 10 illustrates a flow diagram of one embodiment of a method for operating a harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for operating an agricultural harvester. Specifically, in several embodiments, an agricultural harvester may include an elevator for carrying harvested crops from a proximal end of the elevator to a distal end of the elevator. The agricultural harvester may also include a storage hopper positioned at the distal end of the elevator for temporarily storing harvested crops therein. For example, the storage hopper may include one or more movable hopper components configured to be moved between an open or discharge position(s) at which the harvested crops expelled from the distal end of the elevator may be discharged from the hopper into an external receiver or storage device (i.e., when operating in a discharge operating mode) and a closed or storage position(s) at which the harvested crops may be stored within a storage volume defined by the hopper (i.e., when operating in a storage harvesting mode). As such, when the external receiver or storage device is not properly positioned relative to the harvester, the hopper component(s) may be moved to the associated closed or storage position(s) to allow the harvested crops expelled from the distal end of the elevator assembly to be stored within the storage volume of the hopper without discontinuing operation of the elevator and/or the remainder of the harvester.

As will be described below, when operating in the storage harvesting mode, it is often desirable to reduce the operational speed of the elevator in order to maximize the on-board storage capacity of the harvester. However, when the operational speed of the elevator is reduced, the harvested crops tend to stack-up or otherwise accumulate within the elevator. Such accumulation of the harvested crops may lead to issues with continued operation of the elevator, such as when the harvested crops are stacked sufficiently high within the elevator so as to contact a wall of the elevator housing and/or otherwise interfere with the operation of various elevator components. Thus, in accordance with aspects of the present subject matter, a crop level sensor may be installed within the elevator that is configured to detect a crop level of the harvested crops positioned on the elevator. Based on signals received from the sensor, a controller may be configured to initiate a control action(s) when the detected crop level of the harvested crops exceeds a threshold crop level. Such control action(s) may be adapted to prevent the harvested crops positioned on the elevator from interfering with the operation of the elevator.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12), which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in a forward direction of travel (e.g., as indicated by arrow 23 in FIG. 1). As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continued to be moved in the forward direction 23 relative to the field 20.

Referring still to FIG. 1, the harvester 10 may also include a base cutter assembly 42 positioned behind the fin roller 30. As is generally understood, the base cutter assembly 42 may include blades (not shown) for severing the sugar cane stalks as the cane is being harvested. The blades, located on the periphery of the assembly 42, may be rotated by a hydraulic motor (e.g., hydraulic motor 43 shown in FIG. 4) powered by the vehicle's hydraulic system. Additionally, in several embodiments, the blades may be angled downwardly to sever the base of the sugar cane as the cane is knocked down by the fin roller 30.

Moreover, the harvester 10 may include a feed roller assembly 44 located downstream of the base cutter assembly 42 for moving the severed stalks of sugar cane from base cutter assembly 42 along the processing path. As shown in FIG. 1, the feed roller assembly 44 may include a plurality of bottom feed rollers 46 and a plurality of opposed, top feed rollers 48. The various bottom and top feed rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20. In one embodiment, one or both sets of the feed rollers 46, 48 may be rotationally driven, for example, by a hydraulic motor (not shown) powered by the vehicle's hydraulic system In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" that may be, for example, six (6) inches long. The billets may then be propelled towards an elevator assembly 52 of the harvester 10 for delivery to an external receiver or storage device (not shown). In one embodiment, the chopper assembly 50 may be rotationally driven, for example, by a hydraulic motor (not shown) powered by the vehicle's hydraulic system As is generally understood, pieces of debris (e.g., dust, dirt, leaves, etc.) separated from the sugar cane billets may be expelled from the harvester 10 through a primary extractor 54, which is located behind the chopper assembly 50 and is oriented to direct the debris outwardly from the harvester 10. Additionally, an extractor fan 56 may be mounted at the base of the primary extractor 54 for generating a suction force or vacuum sufficient to pick up the debris and force the debris through the primary extractor 54. The separated or cleaned billets, heavier than the debris being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights 68 attached to and evenly spaced on the chain 66. The flights 68 may be configured to hold the sugar cane billets on the elevator 60 as the billets are elevated along a top span 70 of the elevator 60 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the flights 68 to travel in an endless loop between the proximal and distal ends 62, 64 of the elevator 60.

Moreover, pieces of debris (e.g., dust, dirt, leaves, etc.) separated from the elevated sugar cane billets may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris outwardly from the harvester 10. Additionally, an extractor fan 80 may be mounted at the base of the secondary extractor 78 for generating a suction force or vacuum sufficient to pick up the debris and force the debris through the secondary extractor 78. The separated, cleaned billets, heavier than the debris expelled through the extractor 78, may then fall from the distal end 64 of the elevator 60. Typically, the billets may fall downwardly through a discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets (e.g., 6 inch cane sections). Airborne debris or chaff (e.g., dust, dirt, leaves, etc.) separated from the sugar cane billets is then extracted through the primary extractor 54 using suction created by the extractor fan 56. The separated/cleaned billets then fall downwardly into the elevator assembly 52 and travel upwardly via the elevator 60 from its proximal end 62 to its distal end 64. During normal operation, once the billets reach the distal end 64 of the elevator 60, the billets fall through the discharge opening 82 to an external storage device. Similar to the primary extractor 54, chaff is blown out from harvester 10 through the secondary extractor 78 with the aid of the extractor fan 80.

Additionally, in accordance with aspects of the present subject matter, the elevator assembly 52 may also include a storage hopper 100 coupled to the elevator housing 58 at a location adjacent to the distal end 64 of the elevator 60 (e.g., at a location below the elevator 60 and the secondary extractor 78). As shown in FIG. 1, the storage hopper 100 may be configured to at least partially define the discharge opening 82 of the elevator assembly 52. As will be described in greater detail below, the storage hopper 100 may include a hopper gate 102 that is movable between a discharge position and a storage position. When the hopper gate 102 is located at its discharge position, the harvester 10 may be operated in its typical unloading mode (e.g., referred to hereinafter as its discharge harvesting mode) in which the billets expelled from the distal end 64 of the elevator 60 fall through the discharge opening 82 to an associated external storage device. However, when the hopper gate 102 is located at its storage position, the hopper gate 102 may cover or block the discharge opening 82 to prevent the billets from being discharged from the elevator assembly 52. In such operating mode, the billets expelled from the distal end 64 of the elevator 60 may fall into a storage volume 104 defined by the storage hopper 100 for temporary storage therein.

Moreover, in several embodiments, the harvester 10 may also include one or more crop flow sensors 304 configured to monitor one or more crop flow parameters of the harvester 10. In general, the crop flow parameter(s) may correspond to any suitable operating parameter(s) of the harvester 10 that provides an indication of or that may otherwise be correlated to a crop mass flow or throughput of the harvested material through the harvester 10. As such, the crop flow sensor(s) 304 may generally correspond to any suitable sensor or sensing device that is configured to monitor a given crop flow parameter(s). For instance, the crop flow sensor(s) 304 may correspond to one or more pressure sensors for monitoring a fluid pressure of the hydraulic fluid supplied within a hydraulic circuit of the vehicle hydraulic system, one or more torque sensors for monitoring an operating torque of one or more rotating components of the harvester 10, one or more position sensors for monitoring the relative position of one or more components that are configured to move with changes in the crop mass flow, one or more yield sensors configured to directly or indirectly monitor the crop throughput, one or more crop level sensors configured to detect crop levels or fill heights within the elevator assembly 52, and/or any other suitable sensors.

Additionally, as shown in FIG. 1, the crop flow sensor(s) 304 may be provided in operative association with any number of harvester components and/or installed at any suitable location within and/or relative to the harvester 10. For instance, as shown in the illustrated embodiment, one or more crop flow sensors 304 may be provided in operative association with one or more of the components of the vehicle feed train system, such as one or more components associated with the base cutter assembly 42, the feed roller assembly 44, and/or the chopper assembly 50. Alternatively, the crop flow sensor(s) 304 may be provided in operative association with any other suitable components and/or installed at any other suitable location that allows for a crop flow parameter(s) of the harvester 10 to be monitored, such as at a location within the elevator housing 58 of the elevator assembly 52.

Referring now to FIGS. 2 and 3, side views of a distal portion of the elevator assembly 52 shown in FIG. 1 are illustrated in accordance with aspects of the present subject matter, particularly illustrating the storage hopper 100 located adjacent to the distal end 64 of the elevator 60. Specifically, FIG. 2 illustrates the hopper gate 102 of the storage hopper 100 at its discharge position to allow the harvester 10 to be operated in its discharge harvesting mode. Similarly, FIG. 3 illustrates the hopper gate 102 of the storage hopper 100 at its storage position to allow the harvester 10 to be operated in its storage harvesting mode.

In several embodiments, the storage hopper 100 may be positioned at or adjacent to the distal end 64 of the elevator 60 such that billets expelled from the elevator 60 at its distal end 64 fall downwardly into the storage hopper 100. For instance, as shown in FIGS. 2 and 3, the storage hopper 100 may extend downwardly from the elevator housing 58 such that the hopper 100 includes a bottom side 108 spaced vertically apart from the elevator housing 58 at a location below the distal end 64 of the elevator 60 and a rear side 110 (FIG. 2) positioned below the secondary extractor 78.

In several embodiments, the storage hopper 100 may include a hopper gate 102 movable along the bottom side 108 of the hopper 100 and a rear deflector 112 movable relative to the rear side 110 of the hopper 100. The storage hopper 100 may also include a pair of sidewalls 114 (only one of which is shown) extending outwardly from the elevator housing 58 to the bottom and rear sides 110, 112 of the hopper 100. Additionally, as shown in FIGS. 2 and 3, the storage hopper 100 may include a front deflector 116 spaced forward of the rear side 110 of the hopper 100. In one embodiment, the discharge opening 82 of the elevator assembly 52 may be defined between the front deflector 116 and the rear deflector 112 along the bottom side 108 of the hopper 100.

As indicated above, the hopper gate 102 may be configured to be moved between a discharge position (FIG. 2) and a storage position (FIG. 3). Additionally, in one embodiment, the rear deflector 112 may be movable between an opened position (FIG. 2) and a closed position (FIG. 3). In several embodiments, when it is desired to operate the harvester 10 in its discharge harvesting mode, the hopper gate 102 may be moved to its discharge position while the rear deflector 112 may be moved to its opened position. For instance, as shown in FIG. 2, when in the discharge position, the hopper gate 102 may be moved away from the rear side 110 of the hopper 100 (e.g., in the direction of arrow 118) to expose the discharge opening 82 defined along the bottom side 108 of the hopper 100 between the front and rear deflectors 116, 112. Similarly, as shown in FIG. 2, when in the opened position, the rear deflector 112 may be pivoted relative to the rear side 110 of the hopper 100 away from both the hopper gate 102 and the front deflector 116 (e.g., in the direction of arrow 120) to enlarge the discharge opening 82. As such, harvested crop expelled from the distal end 64 of the elevator 60 may fall through the discharge opening 82 and, thus, may be discharged from the elevator assembly 52.

Moreover, when it is desired to operate the harvester 10 in its storage harvesting mode, the hopper gate 102 may be moved to its storage position while the rear deflector 112 may be moved to its closed position. For instance, as shown in FIG. 3, when in the storage position, the hopper gate 102 may be moved towards the rear side 110 of the hopper 100 (e.g., in the direction of arrow 122) to cover the discharge opening 82 defined along the bottom side 108 of the hopper 100. Similarly, as shown in FIG. 3, when in the closed position, the rear deflector 112 may be pivoted relative to the rear side 110 of the hopper 100 towards both the hopper gate 102 and the front deflector 116 (e.g., in the direction of arrow 124) until the rear deflector 112 contacts or is otherwise positioned directly adjacent to the hopper gate 102. When the hopper gate 102 and the rear deflector 112 are located at such positions, the storage hopper 100 may be configured to define a storage volume 104 for storing the harvested crop expelled from the distal end 64 of the elevator 60. Specifically, as shown in FIG. 3, the storage volume 104 may extend between a forward end 126 defined by the front deflector 116 and a rear end 128 defined by the rear deflector 112. Additionally, the storage volume 104 may extend crosswise between the opposed sidewalls 114 of the hopper 100 and vertically between the distal end 64 of the elevator 60 and the hopper gate 102. Thus, harvested crops expelled from the distal end 64 of the elevator 60 may fall down onto the bottom of the storage volume 104 defined by the hopper gate 102 and accumulate within the storage volume 104 between the front and rear deflectors 116, 112 and the opposed sidewalls 114.

It should be appreciated that the storage volume 104 defined by the storage hopper 100 may generally correspond to any suitable volume sufficient to store a desired amount of billets within the hopper 100. However, in several embodiments, the storage hopper 100 may be configured such that the storage volume 104 is substantially equal to the maximum storage volume defined by the top span 70 of the elevator 60 (i.e., the top side of the elevator 60 along which the billets are conveyed between the elevator's proximal and distal ends 62, 64). As used herein, the storage volume 104 defined by the storage hopper 100 may be considered to be substantially equal to the maximum storage volume defined by the top elevator span 70 if the storage volume 104 is within +/−20% of the maximum storage volume defined by the top elevator span 70, such as within +/−10% of the maximum storage volume defined by the top elevator span 70 or within +/−5% of the maximum storage volume defined by the top elevator span 70 and/or any other subranges therebetween.

Additionally, it should be appreciated that, in other embodiments, the rear deflector 112 may not be movable, but, instead, may be fixed or stationary. In such embodiments, only the hopper gate 102 may be configured to be moved to switch the operation of the harvester 10 between its discharge and storage harvesting modes. For instance, when it is desired to operate the harvester 10 in its storage harvesting mode, the hopper gate 102 may be moved towards the fixed rear deflector 112 to the storage position at which the hopper gate 102 contacts or is otherwise positioned directly adjacent to the deflector 112. Similarly, when it is desired to operate the harvester 10 in its discharge harvesting mode, the hopper gate 102 may be moved away from the rear deflector 112 to expose the discharge opening 82 of the elevator assembly 52.

As shown in FIGS. 2 and 3, in several embodiments, the elevator assembly 52 may include a gate actuator 130 configured to move the hopper gate 102 between its discharge and storage positions. In general, the gate actuator 130 may correspond to any suitable actuation mechanism and/or device. For instance, in one embodiment, the gate actuator 140 may include a gear and rack assembly for moving the hopper gate 102 between its discharge and storage positions. Specifically, as shown in FIGS. 2 and 3, the hopper gate 102 may include a rack 132 configured to engage a corresponding drive gear 134 coupled to a motor 136 (e.g., an electric motor or a hydraulic motor powered by the vehicle's hydraulic system). In such an embodiment, by rotationally driving the drive gear 134 in one direction or the other via the motor 136, the hopper gate 102 may be linearly actuated between its discharge and storage positions (e.g., as indicated by arrows 118, 122). Alternatively, the gate actuator 130 may correspond to any other suitable actuation mechanism and/or device, such as any other suitable linear actuator (e.g., a cylinder) and/or the like.

Additionally, in several embodiments, the elevator assembly 52 may include a deflector actuator 138 configured to move the rear deflector 112 between its opened and closed positions. In general, the deflector actuator 138 may correspond to any suitable actuation mechanism and/or device. For instance, in one embodiment, the deflector actuator 138 may correspond to a linear actuator, such as a fluid-driven cylinder actuator or an electric actuator (e.g., a solenoid-activated actuator). Specifically, as shown in FIGS. 2 and 3, the deflector actuator 138 may be coupled to a portion of the elevator housing 58 and/or a portion of the secondary extractor 78 and may include a drive rod 140 secured to a portion of the rear deflector 112. In such an embodiment, by linearly actuating the drive rod 140 in one direction or the other, the rear deflector 112 may be pivoted relative to the rear side 110 of the hopper 100 between its opened and closed positions. Alternatively, the deflector actuator 138 may correspond to any other suitable actuation mechanism and/or device, such as any other suitable linear actuator (e.g., a gear and rack assembly) and/or the like.

It should be appreciated that, in several embodiments, the operation of the gate actuator 130 and/or the deflector actuator 138 may be configured to be electronically controlled via a controller 302 of the harvester 10. For instance, as shown in FIGS. 2 and 3, the controller 302 may be communicatively coupled to the gate actuator 130 and the deflector actuator 138 via one or more communicative links 144, such as a wired connection and/or a wireless connection. In the event that the gate actuator 130 and/or the deflector actuator 138 corresponds to a fluid-driven component(s), the controller 302 may, instead, be communicatively coupled to suitable electronically controlled valves and/or other suitable fluid-related components for controlling the operation of the actuator(s) 130, 138. Regardless, by providing the disclosed communicative links between the controller 302 and the actuators 130, 138, the controller 302 may be configured to control the operation of the actuators 130, 138 based on inputs received from the operator of the harvester 10. For instance, as will be described below, the controller 302 may be configured to receive operator inputs associated with the desired operating mode for the harvester 10. Specifically, the operator may provide an operator input indicating the desire to switch the operation of the harvester 10 from the discharge harvesting mode to the storage harvesting mode. In such instance, the controller 302 may be configured to electronically control the operation of the actuators 130, 138 to move the hopper gate 102 to its storage position and the rear deflector 112 to its closed position. Similarly, if the operator provides an operator input indicating the desire to switch the operation of the harvester 10 from the storage harvesting mode back to the discharge harvesting mode, the controller 302 may be configured to electronically control the operation of the actuators 130, 138 to move the hopper gate 102 to its discharge position and the rear deflector 112 to its opened position.

Referring still to FIGS. 2 and 3, in several embodiments, a sealing device 150 may be provided at the top end of the front deflector 112 for sealing the gap defined between the front deflector 116 and the flights 68 of the elevator 60 as the flights 68 are conveyed past the deflector 116. For instance, in one embodiment, the sealing device 150 may correspond to a flexible sealing member, such as a brush seal or an elastic seal. In such an embodiment, the sealing device 150 may be configured to flex or bend as the flights 68 are conveyed past the front deflector 116. By providing the sealing device 150, the billets stored within the storage volume 104 of the hopper 100 when the harvester 10 is operating in its storage harvesting mode may be prevented from tumbling over the top of the front deflector 116 and/or being pulled back down the bottom span of the elevator 60 via the passing flights 68.

Referring now to FIGS. 4 and 5, side views of a proximal portion of the elevator assembly 52 shown in FIG. 1 are illustrated in accordance with aspects of the present subject matter, particularly illustrating a crop level sensor 200 located adjacent to the proximal end 62 of the elevator 60. Specifically, FIG. 4 illustrates the crop level sensor 200 when the harvested crop carried by the elevator 60 falls below a threshold crop level. Similarly, FIG. 5 illustrates the crop level sensor 200 when the harvested crop carried by the elevator 60 exceeds the threshold crop level.

As shown in FIGS. 4 and 5, the crop level sensor 200 may generally be provided in operative association with the elevator assembly 52. In general, the crop level sensor 200 may be configured to detect the crop level or height of the sugar cane billets or other harvested crop carried by the elevator 60. As such, the crop level sensor 200 may generally to be installed within and/or relative to the elevator 60 at any suitable location that allows the sensor 200 to detect the level of the billets positioned thereon. For instance, as shown in the illustrated embodiment, the crop level sensor 200 may be installed at or adjacent to the proximal end 62 of the elevator 60, such as by mounting crop level sensor 200 to the inner side of the elevator housing 58. As such, the crop level sensor 200 may generally be positioned closer to the proximal end 62 of the elevator 60 than the distal end 64 of the elevator 60. However, in other embodiments, the crop level sensor 200 may be mounted at any other suitable location within the elevator assembly 52 and/or relative to the elevator 60.

It should be appreciated that any suitable number of crop level sensors 200 may be installed relative to the elevator 60, such as a single crop level sensor 200 or two or more crop level sensors 200. Additionally, it should be appreciated that, when utilizing multiple crop level sensors 200, the crop level sensors 200 may be positioned at differing heights within the elevator assembly 52 to allow each crop level sensor 200 to detect when the level or height of billets carried by the elevator 60 has reached or exceeded a threshold level associated with that sensor 200, thereby providing the capability to monitor the billet level relative to two or more threshold levels. Alternatively, the sensors 200 may be mounted at the same relative height relative to the elevator 60.

It should also be appreciated that the crop level sensor(s) 200 may generally correspond to any suitable sensor(s) capable of detecting the level or height of the billets carried by or otherwise positioned on the elevator 60. For example, in one embodiment, the crop level sensor(s) 200 may correspond to a contact sensor(s), such as one or more pressure sensors, load sensors and/or the like. In such an embodiment, the contact-based crop level sensor(s) 200 may be configured to be positioned relative to the elevator 60 at or adjacent to a crop level height(s) corresponding to a predetermined crop level threshold(s), thereby allowing the sensor(s) 200 to provide an indication as to when the actual crop level on the elevator 60 has reached and/or exceeded the predetermined threshold crop level. In another embodiment, the crop level sensor(s) 200 may correspond to a non-contact sensor(s), such as one or more optics-based sensors (e.g., an IR beam sensor(s), a camera(s), a LIDAR sensor or other laser range-finding sensor), one or more acoustic-based sensors (e.g., an ultrasonic sensor(s)), one or more radar sensors and/or the like. In such an embodiment, the non-contact-based crop level sensor(s) 200 may be positioned relative to the elevator 60 at any suitable location that allows the sensor(s) 200 to detect the level or height of the billets relative to one or more threshold levels or heights.

As will be described in greater detail below, the crop level sensor(s) 200 may be communicatively coupled to the associated system controller (e.g., the controller 302) of the present subject matter, thereby allowing the controller 302 to receive sensor data or signals from the crop level sensor(s) 200. As such, based on the data/signals received from the sensor(s) 200, the controller 302 may determine when the level or height of the billets carried by or positioned on the elevator 60 has reached or exceeded a predetermined threshold crop level. In response to the determining that the billet level/height has reached/exceeded the threshold level/height, the controller 302 may then be configured to initiate one or more related control actions, such as by stopping or adjusting the operation of the elevator 60 and/or initiating any other suitable control action(s) (e.g., initiating vehicle-to-vehicle communications with a separate vehicle, such as an associated receiver).

Referring now to FIGS. 6 and 7, various views of one embodiment of a particular sensor configuration that may be used for one or more of the crop level sensors 200 described above with reference to FIGS. 4 and 5 are illustrated in accordance with aspects of the present subject. Specifically, FIG. 6 illustrates a front view of the crop level sensor 200, particularly illustrating a paddle 202 of the sensor 200. Similarly, FIG. 7 illustrates a rear view of the crop level sensor 200, particularly illustrating an arm 204 and a sensing element 206 of the sensor 200. It should be appreciated that FIGS. 6 and 7 illustrate an embodiment of a contact-based sensor configuration for the crop level sensor 200 that may be utilized in accordance with aspects of the present subject matter. However, in other embodiments, the disclosed crop level sensor(s) 200 may have any other suitable sensor configuration, including any other suitable contact-based sensor configuration and/or any other suitable non-contact-based sensor configuration.

As shown, the paddle 202 of the crop level sensor 200 may be pivotably coupled to or otherwise pivotably supported by a sensor body 208 of the sensor 200. The sensor body 208 may, in turn, be coupled to or mounted on the elevator housing 58 or another suitable component of the elevator assembly 52. As such, when billets being carried by the elevator 60 contact the paddle 202, the paddle 202 may move relative to the sensor body 208 and/or the elevator housing 58. In this regard, the sensor element 206 of the sensor 200 may be configured to detect such movement of the paddle 202 and output a signal(s) that indicates that the billets being carried by the elevator 60 have reached the threshold level or height associated with the installed height of the paddle 202 within the elevator assembly 52. Upon receipt of the signal(s), the associated controller 302 may then be configured to initiate a suitable control action, such as by stopping or adjusting the operation of the elevator 60 and/or initiating any other suitable control action(s) (e.g., initiating vehicle-to-vehicle communications with a separate vehicle, such as an associated receiver).

In one embodiment, the sensor element 204 may correspond to a proximity sensor 210. In such embodiment, the proximity sensor 210 may be configured to detect movement of an arm 204 coupled to the paddle 202. More specifically, as shown in FIGS. 6 and 7, the paddle 202 may be coupled to one end of a shaft 212 of the sensor 200 and the arm 204 may be coupled to an opposed end of the shaft 214. The shaft 212 may, in turn, extend through an aperture 214 defined by the sensor body 208 such that the paddle 202 is positioned on one side of the sensor body 208 and the arm 204 is positioned on the opposed side of the sensor body 208. As the paddle 202 moves in a forward direction (e.g., as indicated by arrow 216) and/or in a reverse direction (e.g., as indicated by arrow 218), the arm 204 may also move in the corresponding direction. In this regard, the proximity sensor 210 may be coupled to or positioned on the sensor body 208 proximate to the arm 204 so as to detect such movement of the arm 204. For example, the arm 204 may move toward the proximity sensor 210 when the paddle 202 moves in the forward direction 216. Conversely, the arm 204 may move away the proximity sensor 210 when the paddle 202 moves in the reverse direction 218. It should be appreciated that, in alternative embodiments, the paddle 202 and the arm 204 may be positioned on the same side of the sensor body 208. Furthermore, it should be appreciated that the sensor 200 may have any other suitable construction that permits the proximity sensor 210 to detect pivotal movement of the paddle 202 relative to the sensor body 208.

As particularly illustrated in FIG. 7, the sensor 200 may include a biasing member 220 that is configured to bias the paddle 202 to a predetermined paddle position relative the sensor body 208. Specifically, as shown, one end of the biasing member 220 may be coupled to the arm 204 at a mounting point 222, while an opposed end of the biasing member 220 may be coupled to the elevator housing 58 or sensor body 208 at a mounting point 224. As such, when the billets contact the paddle 202, the paddle 202 may be configured to pivot away from the predetermined paddle position against the bias of the biasing member 220, such as by moving in the forward direction 216. Once the contacting billets move away from the paddle 202, the paddle 202 returns to the predetermined paddle position under the influence of the biasing member 220, such as by moving in the reverse direction 218. In one embodiment, when positioned at the predetermined paddle position, the paddle 202 may be oriented parallel to a direction of gravity (e.g., as indicated by arrow 226).

In the illustrated embodiment, the biasing member 220 element corresponds to a spring. However, it should be appreciated that, in alternative embodiments, the biasing member 220 may correspond to any other suitable device configured to bias the paddle 202 to the predetermined paddle position relative to the sensor body 208.

Referring back to FIGS. 4 and 5, the operation of the sensor 200 is illustrated. As particularly shown in FIG. 4, when the billets being carried by the elevator 60 are stacked to a level or height that is less than a threshold level or height associated with the installed height of the paddle 202 within the elevator assembly 52, the billets may pass underneath the paddle 202 as the billets are conveyed from the proximal end 62 of the elevator 60 to the distal end 64 of the elevator 60. In such instance, the paddle 202 may remain in the predetermined paddle position and the sensor 200 may transmit a signal(s) to the associated controller 302 indicating that the billets are below the threshold level or height. Conversely, as particularly shown in FIG. 5, when the billets being carried by the elevator 60 are stacked to a level or height that is at or greater than the threshold level or height, the billets may contact the paddle 202 as the billets are conveyed from the proximal end 62 of the elevator 60 to the distal end 64 of the elevator 60. Such contact may cause the paddle to pivot (e.g., in the forward direction 216) relative to the sensor body 208 and the elevator housing 58. In such instance, the sensor 200 may transmit a signal(s) to the associated controller 302 indicating that the billets are at or above the threshold level or height.

Referring now to FIG. 8, a side view of another embodiment of the sensor 200 described above with reference to FIGS. 6 and 7 is illustrated in accordance with aspects of the present subject matter. As shown, the sensor 200 may generally be configured the same as or similar to that described above with reference to FIGS. 6 and 7. For instance, the sensor 200 may include a paddle 202 that is configured to pivot relative to a sensor body 208 of the sensor 200 when contacted by billets or other crops being carried by the elevator 60, with a sensor element 206 being configured to detect such pivotal movement of the paddle. However, as shown in FIG. 8, unlike the above-described embodiment, the sensor element 206 corresponds to a potentiometer 228. In this respect, the potentiometer 228 may be configured to detect a magnitude of the pivotal movement of the paddle 202. It should be appreciated that, in alternate embodiments, the sensor element may correspond to any other suitable sensing device or element.

Referring now to FIG. 9, one embodiment of a system 300 for operating a harvester is illustrated in accordance with aspects of the present subject matter. In general, the system 300 will be described herein with reference to the harvester 10 described above with reference to FIGS. 1-5 and the crop level sensor 200 shown in FIGS. 6-8. However, it should be appreciated that the disclosed system 300 may generally be utilized with harvesters having any other suitable configuration and/or with crop level sensors having any other suitable sensor configuration.

In several embodiments, the system 300 may include a controller 302 and various other components configured to be communicatively coupled to and/or controlled by the controller 302, such one or more components for controlling the operational speed of the elevator 60 (e.g., the elevator motor 76), one or more components for actuating the hopper gate and the rear deflector (e.g., the gate actuator 130 and the deflector actuator 138), one or more sensors for monitoring one or more operating parameters of the harvester 10 (e.g., the crop flow sensor(s) 304, including the crop level sensor(s) 200), and/or the like. As will be described in greater detail below, the controller 302 may be configured to control the operation of the harvester 10 such that the harvester 10 is normally operated within its discharge harvesting mode during which the billets expelled from the distal end 64 of the elevator 60 fall through the discharge opening 82 to an associated external storage device. However, upon receipt of an input (e.g., an operator input), the controller 302 may be configured to transition the harvester into operation within its storage harvesting mode during which the hopper gate 102 is moved to its storage position and the rear deflector 112 is moved to its closed position to allow the billets to be temporarily stored within the storage volume 104 defined by the storage hopper 100. Additionally, when transitioning to the storage harvesting mode, the controller 302 may be configured to initially reduce the operational speed of the elevator 60. Thereafter, the controller 302 may, for example, be configured to actively adjust the elevator speed, as desired or necessary, based on one or more monitored crop flow parameters of the harvester 10 to match the elevator speed with the current or instantaneous cross mass flow or throughput of the harvester 10, thereby maximizing the storage capacity within the elevator assembly 52 and the associated storage hopper 100 while preventing plugging of the elevator 60.

In general, the controller 302 may correspond to any suitable processor-based device(s), such as a computing device or any combination of computing devices. Thus, as shown in FIG. 9, the controller 302 may generally include one or more processor(s) 306 and associated memory devices 308 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 308 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 308 may generally be configured to store information accessible to the processor(s) 306, including data 310 that can be retrieved, manipulated, created and/or stored by the processor(s) 306 and instructions 312 that can be executed by the processor(s) 306.

In several embodiments, the data 310 may be stored in one or more databases. For example, the memory 308 may include a parameter database 320 for storing data associated with one or more monitored parameters of the harvester 10, such as one or more crop flow parameters. As indicated above, the crop flow parameter(s) may generally correspond to any suitable operating parameter of the harvester 10 that provides an indication of or may otherwise be correlated to a crop mass flow or throughput of the harvested material through the harvester 10, such as hydraulic pressure(s), operating torque(s), certain component position(s), yield data, and/or the like. Additionally, as indicated above, the crop flow parameter(s) may also correspond to the crop levels/heights of the billets or other harvested crops carried by the elevator 60. In several embodiments, sensor data associated with one or more such operating parameters may be stored within the parameter database 320.

As particularly shown in FIG. 9, to allow the controller 302 to monitor the crop flow parameter(s), the controller 302 may be communicatively coupled to one or more crop flow sensors 304. As indicated above, the crop flow sensor(s) 304 may generally correspond to any suitable sensor or sensing device that is configured to monitor a given crop flow parameter(s). For instance, in one embodiment, the crop flow sensor(s) 304 may correspond to one or more pressure sensors configured to monitor a fluid pressure of the hydraulic fluid supplied to one or more hydraulic motors of the vehicle's hydraulic system via an associated hydraulic circuit, such as the hydraulic circuit associated with the base cutter assembly 42, the feed roller assembly 44, and/or the chopper assembly 50. In another embodiment, the crop flow sensor(s) 304 may correspond to one or more torque sensors configured to monitor an operating torque of one or more rotating components of the harvester 10, such as the hydraulic motor(s) configured to rotationally drive the rotating blades of the base cutter assembly 42, the rollers 46, 48 of the feed roller assembly 44, and/or the chopper assembly 50. In a further embodiment, the crop flow sensor(s) 304 may correspond to one or more position sensors configured to monitor the relative position of one or more harvester components whose position is dependent on the mass flow or crop throughput of the harvester 10. In yet another embodiment, the crop flow sensor(s) 304 may correspond to one or more yield sensors configured to provide an indication of the crop mass flow through the harvester 10.

Additionally, the crop flow sensor(s) 304 may also correspond to one or more crop level sensors 200. As indicated above, the crop level sensor(s) 202 may be configured to detect the crop level or fill height of the billets being carried by between the paddles 68 of the elevator 60, thereby providing an indication of the crop mass flow or throughput of the harvested material through the harvester 10. For example, when the crop level sensor(s) detects an increase in the crop level or fill height of the billets within the elevator 60, the controller 302 may determine that the mass flow of the billets through the elevator assembly 52 has increased.

Referring still to FIG. 9, in several embodiments, the instructions 312 stored within the memory 308 of the controller 302 may be executed by the processor(s) 306 to implement a discharge harvesting module 314. In general, the discharge harvesting module 314 may be configured to control the operation of the harvester 10 such that the harvester 10 is operated within its discharge harvesting mode. Specifically, to allow for operation within the discharge harvesting mode, the controller 302 may be configured to control the relevant components of the harvester 10 (e.g., the gate actuator 130 and the deflector actuator 138) to ensure that the hopper gate 102 and the rear deflector 112 are moved to their associated discharge and opened positions, respectively (e.g., as shown in FIG. 2), thereby allowing the billets expelled from the distal end 64 of the elevator 60 to fall through the storage hopper 100 and be discharged from the elevator assembly 52 via the discharge opening 82. The billets discharged from the elevator assembly 52 may then fall into an external storage device, such as a sugar cane billet cart. In addition, when operating within the discharge harvesting mode, the controller 302 may be configured to control the operation of the elevator 60 (e.g., via control of the elevator motor 76) such that the elevator 60 is operated at a given elevator speed. As will be described below, the elevator speed for the discharge harvesting mode may be greater than the elevator speed used when operating within the storage harvesting mode.

Additionally, as shown in FIG. 9, the instructions 312 stored within the memory 308 of the controller 302 may also be executed by the processor(s) 306 to implement a storage harvesting module 316. In general, the storage harvesting module 316 may be configured to control the operation of the harvester 10 such that the harvester 10 is operated within its storage harvesting mode. Specifically, to allow for operation within the storage harvesting mode, the controller 302 may be configured to control the relevant components of the harvester 10 (e.g., the gate actuator 130 and the deflector actuator 138) to ensure that the hopper gate 102 and the rear deflector 112 are moved to their associated storage and closed positions, respectively (e.g., as shown in FIG. 3) to cover or block the discharge opening 82 of the storage hopper 100, thereby allowing the billets expelled from the distal end 64 of the elevator 60 to be stored within the storage volume 104 defined by the storage hopper 100. Additionally, simultaneous with covering or blocking the discharge opening 82 (or immediately before or after such control action), the controller 302 may be configured to reduce the operational speed of the elevator 60. For example, when initiating the storage harvesting mode, the controller 302 may be configured to reduce the operational speed of the elevator from its normal operating speed to a pre-set or predetermined default elevator speed setting. This speed setting may, for instance, correspond to a manufacturer-defined setting and/or an operator-defined setting. In addition, the default speed setting may be adjusted, as desired or necessary, by the operator to fine tune such default speed setting based the anticipated or expected pour rate of the harvester 10.

It should be appreciated that, in one embodiment, the default speed setting may generally correspond to a given percentage of the normal operational speed for the elevator 60 during operation within the discharge harvesting mode. For instance, in one embodiment, the default elevator speed setting for the storage harvesting mode may correspond to a speed that is less than about 75% of the normal operational speed of the elevator 60 during operation within the discharge harvesting mode, such as a speed ranging from about 10% to about 50% of the normal operating speed and/or a speed ranging from about 10% to about 25% of the normal operating speed.

Once the operational speed of the elevator 60 has been reduced to the default speed setting, the storage harvesting module 316 may, in several embodiments, then be configured to continuously monitor the crop flow parameter(s) of the harvester 10 (e.g., via the crop flow sensor(s) 304), including the crop level sensor(s) 200) to detect changes in the crop mass flow through the harvester 10. Thereafter, the storage harvesting module 316 may be configured to actively adjust the operational speed of the elevator 60 when it is determined that a change in the crop mass flow has occurred. For instance, if it is determined based on the monitored crop flow parameter(s) that the crop mass flow through the harvester 10 has increased, the storage harvesting module 316 may be configured to increase the operational speed of the elevator (e.g., via control of the elevator motor 76). Similarly, if it is determined based on the monitored crop flow parameter(s) that the crop mass flow through the harvester 10 has decreased, the storage harvesting module 316 may be configured to reduce the operational speed of the elevator 60 (e.g., via control of the elevator motor 76). In doing so, the magnitude of the elevator speed adjustment made by the controller 302 may vary, for example, based on the magnitude of the detected change in the crop mass flow.

Specifically, in accordance with aspects of the present subject matter, the storage harvesting module 316 may be configured to actively adjust the operational speed of the elevator 60 based on the level/height of the billets present on the elevator 60. For example, using the sensor configuration described above with reference to FIGS. 6-8, the crop level sensor(s) 200 may be configured to transmit sensor data/signals to the storage harvesting module 316 when the billet level/height reaches the installed location of the sensor(s) 200. In such an embodiment, the storage harvesting module 316 may be configured to actively monitor the crop level or fill height of the billets within the elevator assembly 52 via the data/signals received from the crop level sensor(s) 200. When it is determined that the crop level of the billets has reached the threshold crop level associated with the installed location of the sensor(s) 200 (e.g., by detecting pivoting of the associated paddle 202), the storage harvesting module 316 may be configured to increase the operational speed of the elevator (e.g., via control of the elevator motor 76). In doing so, the storage harvesting module 316 may, for example, be configured to increase the operational speed of the elevator 60 by a predetermined amount (e.g., a given incremental amount). Thereafter, the controller 302 may be configured to continue monitoring the crop level or fill height of the billets within the elevator assembly 52 via the data/signals received from the crop level sensor(s) 200 to evaluate whether the increase in speed has effectively reduced the crop level within the elevator 60. If the data/signals from the sensor(s) 200 indicates that the crop level still remains at threshold crop level, the storage harvesting module 316 may be configured to further increase the operational speed of the elevator 60 (e.g., by a another incremental amount). In contrast, if the crop level sensor(s) 200 is no longer being triggered following the initial increase in speed, the storage harvesting module 316 may be configured to maintain the operational speed of the elevator 60 at its current speed. In addition, in one embodiment, if the crop level sensor(s) 200 has not been triggered for a given period of time following the initial increase in speed, the storage harvesting module 316 may be configured to slightly reduce the operational speed of the elevator 60 (e.g., by a lesser degree than the initial speed increase) to determine whether the elevator 60 can similarly be operated at such reduced speed without triggering the sensor(s) 200.

It should be appreciated that, in one embodiment, the storage harvesting module 316 may be configured to initiate the transition between the operating modes when an operator input is received by the controller 302 that is associated with switching the operation of the harvester 10 from its discharge harvesting mode to its storage harvesting mode. For instance, as indicated above, it may be desirable to operate the harvester 10 in its storage harvesting mode when an associated external storage device is not properly positioned relative to the discharge opening 82 for collecting the discharged billets, such as when rotating the billet carts and/or when turning/resuming harvesting at the end of row without the billet cart being in position. In such instance(s), the operator may be allowed to provide a suitable operator input to the controller 302 indicating the desire to switch operation of the harvester 10 to the storage harvesting mode. For instance, a suitable input device (e.g., a button, knob, lever, switch, etc.) may be provided within the operator's cab 18 to allow the operator to provide the operator input to the controller 302. Alternatively, the storage harvesting module 316 may be configured to initiate the transition between the operating modes when any other suitable input is received by the controller 302 that is associated with switching the operation of the harvester 10 from its discharge harvesting mode to its storage harvesting mode. For instance, the controller 302 may be configured to receive vehicle-to-vehicle communications indicating that the associated external storage device is about to leave or is otherwise not properly positioned relative to the harvester 10. In such instance, upon receipt of the input, the controller 302 may configured to initiate the harvester's storage harvesting mode.

It should also be appreciated that, when monitoring the billet level/height within the elevator assembly 52 via the data/signals received from the crop level sensor(s) 200, the storage harvesting module 316 may be configured to adjust the operational speed of the elevator 60 each time the sensor(s) is triggered. Alternatively, the storage harvesting module 316 may only be configured to adjust the operational speed of the elevator 60 when it is determined that the crop level sensor(s) 200 has been triggered a given number of times within a predetermined time period.

Specifically, in one embodiment, when monitoring the data/signals received from the crop level sensor(s) 200, the storage harvesting module 316 may be configured to determine a number of times that the billet level/height has reached the predetermined threshold level associated with the location of the sensor(s) 200 during a predetermined time period. For example, using the sensor configuration described above with reference to FIGS. 6-8, the storage harvesting module 316 may be configured to determine a number of times that the storage harvesting module 316 receives sensor data/signals from the crop level sensor(s) 200 during the predetermined time period. When the monitored number of times exceeds a threshold number, the storage harvesting module 316 may then being configured to initiate a control action(s), such as increasing the operating speed of the elevator 60 to reduce the height to which the billets build up or stack on the elevator 60 or by providing a visual or audible notification to the operator of the harvester 10.

It should be appreciated that, by waiting to increase the operational speed of the elevator 60 until after the billet level/height has reached the predetermined threshold level at least the threshold number of times during the predetermined time period, the controller 302 may be prevented from adjusting the elevator speed due to false triggers of the sensor(s) 202. For example, it may be unnecessary to increase the operational speed of the elevator 60 when a single or small number of billets are oriented in a manner that activates the sensor(s) 200 (e.g., pivots the paddle(s) 202), but the overall level/height of the billets on the elevator 60 remains below the threshold crop level such that there is minimal risk of plugging the elevator assembly 52.

In one embodiment, the storage harvesting module 318 may be configured to initiate different control actions based on the magnitudes of the billet levels/heights. For example, using the sensor configuration described above with reference to FIG. 8, the crop level sensor(s) 200 may be configured to transmit sensor data/signals to the storage harvesting module 316 when the billet level/height reaches the location of the sensor (e.g., contacts the paddle 202), with such sensor data/signals being indicative of the magnitude of the billet level/height once the billet level/height exceeds the sensor location. In such instance, based on the receipt of sensor data/signals received form the crop level sensor(s) 200, the storage harvesting module 318 may determine that the billet level/height has reached a first predetermined threshold level. Thereafter, the storage harvesting module 318 may be configured compare the magnitude of the displacement of the paddle 202 from the predetermined paddle positon to a second predetermined threshold level to determine when the billet level/height has exceeded the second predetermined threshold level. In general, the second predetermined threshold level may be greater than the first predetermined threshold level. For example, the first predetermined threshold level may be associated with a level/height of billets that presents a lower risk of plugging the elevator assembly 52; whereas, the second predetermined threshold level may be associated with a level/height of billets that presents a higher risk of plugging the elevator assembly 52.

The storage harvesting module 316 may then be configured to determine the first number of times that the billet level/height has reached the first and second predetermined threshold levels during the first predetermined time period. When the monitored number of times that the billet level/height has reached the predetermined first threshold level exceeds the first threshold number, the storage harvesting module 316 may then being configured to initiate a suitable first control action, such as providing a visual or audible notification to the operator of the harvester 10. Conversely, when the monitored number of times that the billet level/height has reached the predetermined second threshold level exceeds the first threshold number, the storage harvesting module 316 may then be configured to initiate a suitable second control action, such as increasing the operating speed of the elevator 60 to reduce the height to which the billets build up or stack on the elevator 60.

Additionally, in several embodiments, after increasing the operational speed of the elevator 60, the storage harvesting module 316 may be configured to decrease the operating speed of the elevator when the harvested crops carried by the elevator fail to exceed the threshold crop level during a second predetermined time period. For example, using the sensor configuration described above with reference to FIGS. 6-8, the storage harvesting module 316 may be configured to monitor a time period during which the storage harvesting module 316 fails to receive sensor signals/data from crop level sensor(s) 200. When the this time period exceeds a threshold time period, the storage harvesting module 316 may then being configured to initiate a suitable control action(s), such as decreasing the operating speed of the elevator 60 to increase the height to which the billets build up or stack on the elevator 60. It should be appreciated that the first and second predetermined time periods may be the same or different.

Furthermore, as shown in FIG. 9, the controller 302 may also include a communications interface 318 to provide a means for the controller 302 to communicate with any of the various other system components described herein. For instance, one or more communicative links or interfaces 320, 144 (e.g., one or more data buses) may be provided between the communications interface 318 and the crop flow sensor(s) 304 (including the crop level sensor(s) 200) to allow the controller 302 to receive measurement signals from the sensor(s) 304, 200. Similarly, as indicated above, one or more communicative links or interfaces 144 (e.g., one or more data buses) may be provided between the communications interface 318 and each of the elevator motor 76, the gate actuator 130, and the deflector actuator 138 (and/or a related component(s) configured to control the operation of the motor 76 and actuator(s) 130, 138, such as a related control valve(s)) to allow the operation of such components to be controlled by the controller 302.

Referring now to FIG. 10, a flow diagram of one embodiment of a method 400 for operating an agricultural harvester is illustrated in accordance with aspects of the present subject matter. In general, the method 400 will be described herein with reference to the embodiment of the harvester 10 described above with reference to FIGS. 1-5, the embodiment of the crop level sensor 200 described above with reference to FIGS. 6-8, and the system 300 described above with reference to FIG. 9. However, it should be appreciated by those of ordinary skill in the art that the disclosed method 400 may generally be implemented with any harvester having any suitable harvester configuration, with any crop level sensor(s) have any suitable sensor configuration, and/or within any system having any suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (402), the method 400 may include initially operating the harvester in a discharge harvesting mode such that harvested crops are conveyed from the proximal end of the elevator to the distal end of the elevator and subsequently discharged from the harvester through a discharge opening defined by the storage hopper. Specifically, as indicated above, when operating in the discharge harvesting mode, the hopper gate 102 and the rear deflector 112 may be moved to their associated positions shown in FIG. 2 (e.g., the discharge position and the opened position, respectively) for allowing the billets expelled from the distal end 64 of the elevator 60 to fall through the storage hopper 100 and be discharged from the elevator assembly 52 via the discharge opening 82. The billets discharged from the elevator assembly 52 may then fall into an external storage device, such as a sugar cane billet cart.

Additionally, at (404), the method 400 may include receiving an input associated with switching the operation of the harvester from its discharge harvesting mode to its storage harvesting mode. For instance, as indicated above, it may be desirable to operate the harvester 10 in its storage harvesting mode when an associated external storage device is not properly positioned relative to the discharge opening 82 for collecting the discharged billets, such as when rotating the billet carts and/or when turning/resuming harvesting at the end of row without the billet cart being in position. In such instance(s), the operator may be allowed to provide a suitable operator input to the controller 202 indicating the desire to switch operation of the harvester 10 to the storage harvesting mode. Alternatively, the controller 202 may be configured to detect that the associated external storage device is not properly positioned relative to the harvester 10 based on any other suitable input(s), such as based on inputs from a sensor configured to detect the position of the associated external storage device or inputs associated with vehicle-to-vehicle communications.

Moreover, at (406), the method 400 may include reducing an operating speed of the elevator upon receipt of the input. As indicated above, when operating in the storage harvesting mode, the controller 202 may be configured to reduce the operating speed of the elevator 60 (e.g., via control of the elevator motor 76) from its normal operating speed to a reduced speed setting. In several embodiments, such default speed setting may correspond to a manufacturer-defined setting and/or an operator-defined setting and may be adjustable, as desired or necessary, by the operator or automatically by the controller 202.

Referring still to FIG. 10, at (408), the method 400 may include blocking or covering the discharge opening defined by the storage hopper upon receipt of the input. Specifically, in several embodiments, when operating the harvester 10 in the storage harvesting mode, the hopper gate 102 may be configured to be moved to its storage position and the rear deflector 112 may be configured to be moved to its closed position so that the storage hopper 100 defines a storage volume 104 for receiving the billets expelled from the distal end 64 of the elevator 60. As indicated above, the controller 202 may be configured to automatically move the hopper gate 102 and the rear deflector 112 to their respective positions upon receiving the input indicating that the harvester 10 should be operated in its storage harvesting mode. Such control action may be performed simultaneously with reducing the operating speed of the elevator 60 or may occur immediately before or after the elevator speed adjustment.

Furthermore, at (410), the method 400 may include monitoring a crop level of the harvested crops being conveyed between the proximal and distal ends of the elevator relative to a threshold crop level as the elevator as being operated at the reduced operating speed. Specifically, as indicated above, the controller 202 may be configured to monitor the level or height of the billets contained being carried by the elevator 60 relative to a predetermined threshold level via the data/signals received from the crop level sensor(s) 200.

Additionally, at (412), the method 400 may include increasing the operating speed of the elevator when it is determined that the monitored crop level has exceeded the threshold crop level. Specifically, as indicated above, when it is determined that the billet level or height on the elevator 60 has reached and/or exceeded the predetermined threshold level, the controller 202 may be configured to increase the operating speed of the elevator 60 (e.g., via control of the elevator motor 76).

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for detecting crop levels within an agricultural harvester, the system comprising:
    an elevator extending between a proximal end and a distal end, the elevator being configured to carry harvested crops between the proximal end of the elevator and the distal end of the elevator; and
    a crop level sensor provided in operative association with the elevator, the crop level sensor including a sensor body and a paddle pivotably coupled to the sensor body,
    wherein the paddle is configured to pivot relative to the sensor body when a crop level of the harvested crops conveyed by the elevator exceeds a threshold crop level.

2. The system of claim 1, wherein the crop level sensor further comprises a sensor element configured to detect a parameter indicative of movement of the paddle relative to the sensor body, the sensor element being configured to output a signal indicative of the crop level of the harvested crops conveyed by the elevator when the crop level exceeds the threshold crop level.

3. The system of claim 2, wherein the sensor element corresponds to a proximity sensor, the crop level sensor further comprising a sensor arm coupled to the paddle, the sensor arm being configured to pivot with pivotal motion of the paddle, the proximity sensor being configured to detect a position of the sensor arm relative to the proximity sensor.

4. The system of claim 2, wherein the sensor element corresponds to a potentiometer.

5. The system of claim 1, wherein the crop level sensor further comprises a biasing member configured to bias the paddle to a predetermined paddle position relative to the sensor body, the paddle being configured to pivot away from the predetermined paddle position against the bias of the biasing member upon contact of the harvested crop against the paddle.

6. The system of claim 1, further comprising:
a controller communicatively coupled to the crop level sensor, wherein the controller is configured to initiate a control action when the crop level of the harvested crops conveyed by the elevator exceeds the threshold crop level.

7. The system of claim 6, where the control action corresponds to increasing an operational speed of the elevator.

8. The system of claim 1, wherein the crop level sensor is positioned closer to the proximal end of the elevator than the distal end of the elevator.

9. A system for operating an agricultural harvester, the system comprising:
an elevator extending between a proximal end and a distal end, the elevator being configured to convey harvested crops between the proximal end of the elevator and distal end of the elevator;
a crop level sensor configured to detect a crop level of the harvested crops conveyed by the elevator, the crop level sensor comprising a contact sensor; and
a controller communicatively coupled to the sensor, the controller being configured to determine a first number of times that the crop level of the harvested crops carried by the elevator exceeds a first threshold crop level during a first predetermined time period based on signals received from the crop level sensor, the controller further being configured to initiate a first control action when the determined first number of times exceeds a threshold number,
wherein the contact sensor comprises a sensor body and a paddle configured to pivot relative to the sensor body when the crop level of the harvested crops conveyed by the elevator exceeds the first threshold crop level.

10. The system of claim 9, wherein the first control action corresponds to increasing an operating speed of the elevator.

11. The system of claim 9, wherein the controller is further configured to decrease the operating speed of the elevator when the harvested crops carried by the elevator fail to exceed the first threshold crop level during a second predetermined time period.

12. The system of claim 1, wherein crop level sensor further comprises a sensing element configured to detect a position of the paddle relative to the sensor body, the position of the paddle being indicative of the crop level of the harvested crops conveyed by the elevator, the controller being further configured to monitor the crop level of the harvested crops based on signals received from the crop level sensor and initiate a second control action when the crop level of the harvested crops exceeds a second threshold crop level, the second threshold crop level corresponding to a greater crop level than the first threshold crop level.

13. The system of claim 9, wherein the crop level sensor is positioned closer to the proximal end of the elevator than the distal end of the elevator.

14. A method for operating an agricultural harvester, the harvester comprising an elevator assembly including an elevator extending between a proximal end and a distal end, the elevator assembly further including a storage hopper positioned adjacent to the distal end of the elevator, the method comprising:
initially operating the harvester in a discharge harvesting mode such that harvested crops are conveyed from the proximal end of the elevator to the distal end of the elevator and subsequently discharged from the harvester through a discharge opening defined by the storage hopper;
upon receipt of an input associated with operating the harvester in a storage harvesting mode, reducing an operating speed of the elevator and blocking the discharge opening defined by the storage hopper such that harvested crops expelled from the distal end of the elevator are stored within a storage volume of the storage hopper; and
monitoring a crop level of the harvested crops being conveyed between the proximal and distal ends of the elevator relative to a threshold crop level as the elevator as being operated at the reduced operating speed; and
increasing the operating speed of the elevator when it is determined that the monitored crop level has exceeded the threshold crop level.

15. The method of claim 14, further comprising:
decreasing the operating speed of the elevator when the harvested crops carried by the elevator fail to exceed the first threshold crop level during a second predetermined time period.

16. The method of claim 14, wherein the crop level sensor comprises a contact sensor.

17. The method of claim 16, wherein the crop level sensor comprises a sensor body and a paddle configured to pivot relative to the sensor body when the crop level of the harvested crops conveyed by the elevator exceeds the first threshold crop level.

18. The method of claim 17, wherein crop level sensor further comprises a sensing element configured to detect a position of the paddle relative to the sensor body, the position of the paddle being indicative of the crop level of the harvested crops conveyed by the elevator, the method further comprising:
monitoring the crop level of the harvested crops based on data received from the crop level sensor; and
initiating a second control action when the crop level of the harvested crops exceeds a second threshold crop level, the second threshold crop level corresponding to a greater crop level than the first threshold crop level.

* * * * *